United States Patent [19]

Scott

[11] 4,037,816

[45] July 26, 1977

[54] APPARATUS FOR FORMING A LINER ON A PLANAR FORM MEANS

[76] Inventor: Samuel C. Scott, 2519 Walnut St., Denver, Colo. 80205

[21] Appl. No.: 679,674

[22] Filed: Apr. 23, 1976

[51] Int. Cl.² .................................................. B29C 1/02

[52] U.S. Cl. ........................................ 249/83; 249/112; 249/115; 249/134; 249/165

[58] Field of Search ........ 425/175; 264/220, 225-227; 249/15, 16, 83, 112, 114, 134, 165, 91, 115

[56] References Cited

U.S. PATENT DOCUMENTS

| | | | |
|---|---|---|---|
| 2,964,800 | 12/1960 | Dorsett | 249/16 |
| 3,954,377 | 5/1976 | Scholz et al. | 425/432 |

*Primary Examiner*—Francis S. Husar
*Assistant Examiner*—John McQuade
*Attorney, Agent, or Firm*—Richard D. Law

[57] ABSTRACT

An upright mold for forming planar, thin, flexible, elastomeric liners for large modular concrete forms, to produce surface textured concrete walls and the like, includes a positive master of a flexible elastomeric material, secured to a planar, rigid backing, having normal extending, integral gasketing flanges on three sides, a modular form member having a planar surface mounted in the extending flanges, and means for temporarily securing said modular form member in sealing relation to said flanges and with its planar surface spaced a predetermined distance from the master. Liquid polyurethane precursor is poured into the mold form top side permitting trapped air in the liquid to travel to the surface of the modular form member and upwardly out the top of the mold. A small reservoir of the liquid may be maintained at the top of the mold to insure positive pressure of liquid into the mold for the complete filling of the spaces of the mold with the liquid precursor. A release coating on the master and sometimes on the modular form aids in removal of the elastomeric liner from the mold.

10 Claims, 12 Drawing Figures

APPARATUS FOR FORMING A LINER ON A PLANAR FORM MEANS

This invention relates to form liners for modular concrete forms, and more particularly to apparatus for applying liners to modular concrete forms.

Although an old art, the use of liners in concrete forms for forming decorative surfaces on concrete has become more widespread and popular in recent years because of a growing demand that concrete walls and other concrete structures be cast with finished, decorative surfaces which need little further attention. Various form lining materials are available and polyurethane is becoming one of the more popular materials for this purpose because of its toughness and resilience. Also, the precursors for polyurethane are available as a two liquid components to be blended and poured into a mold. The mixture may shortly thereafter set up as a tough, strong elastomer which can be mounted upon the concrete contacting surface of a concrete form. The polyurethane form liner will not only provide a decorative surface to the concrete, but also, it can be easily stripped from the concrete surface after the concrete has hardened.

The increased use of concrete for wall structures has also brought about considerable improvments in concrete forms, and the trend has been toward modular forms which may be pinned together so as to erect a complete structural wall form. A common type of a modular form consists of an open metal framework with a plywood sheet attached to one side of this framework. This plywood constitutes the face of the form against which concrete is poured. The box-like modular forms are arranged to permit several of these forms to be connected together with lock pins to built up the completed structural form. In disclosing this invention, the term "modular" forms is used in a broad sense including an individual form in random proportions made according to the disclosure.

Form liners may be used with these modular forms by fitting a liner onto the plywood face as by nailing or glueing the liner in place. The surface of the liner which fits against the plywood face is flat while the outward surface of the liner may carry the negative of a decorative pattern which is sometimes called a "matrix." Such liners are comparatively heavy and may be as much as one-inch thick or more, since problems are encountered in handling them if they are made too thin. They are ordinarily cast in an open, horizontal mold, by pouring the precursors of the elastomeric into the mold before they set up. In following this procedure, several problems are encountered. First, the open mold must be absolutely level and the precursors must be carefully spread. Secondly, flashing will form about the lip on all four sides of the mold which must be trimmed and sanded. Finally, the residue must be cleaned off the back of the mold and the liner must be thick to be sufficient strong to permit it to be handled properly, and affixed to the plywood sheet of the modular form. All of these factors increase the cost of the liners and their installation in forms.

The present invention was conceived and developed with the foregoing and other considerations in view. The invention includes a comparatively thin, resilient liner of polyurethane or of a similar material which is molded directly and at the same time affixed, onto the flat plywood face of a modular form and oridinarily, the negative of a decorative surface, a matrix, will be at the outer surface of this liner. The invention also includes an upright mold for casting the liner upon the face of a modular form. Also disclosed is the process of using the upright mold and a modular form within the mold to provide adequate structural strength and proper alignment and permit the mixed liquid precursors to be poured into the cavity between the mold and the form to set up therein and form the liner. The mold has the master, a positive decorative surface which opposes the face of the form. Upon the setting of the liner, in one form, it is tightly adhered to the plywood surface of the mold. The liner may be easily separated from the master surface in the mold, to provide the form liner, by the use of a release agent, if necessary on the surface of the master. Also separation may be effected by the use of an air pod in the liner, or mold, such as hereinafter further described.

The invention further contemplates a slightly flared edging about the sides, bottom and top of the liner which will provide a gasket-like contact between adjacent liners when the modular forms are interlocked into a complete form structure. Such flared edging is readily built into the master, and, also flashing on the surface of the finished concrete structure is, likewise, effectively eliminated because of the seal so attained.

An object of the invention is to provide a novel and improved flexible, resilient, polymeric decorative liner for a modular form which is molded directly upon the face of the form, and when formed with adherence to the form, thereby eliminates all supplemental handling and placement of the liner on a modular concrete form as the form is erected.

Another object of the invention is to provide a novel and improved liner which may have a descriptive surface or a plane surface molded in secured relation upon a modular form, which may be quite thin, with a considerable saving in material and weight.

Another object of the invention is to provide a novel and improved decorative liner for a modular form which can be molded upon the form with a surface configuration shaped to produce a decorative pattern in the concrete, which precisely fits upon the form and against the liners of adjacent forms when the modular form sections are interlocked into a planar structural form, and eliminates adjustments and shifting ordinarily required to match the adjacent liner patterns.

Another object of the invention is to provide a novel and improved decorative liner upon a modular form which can be used repeatedly, and is a low cost, near appearing, rugged and durable addition to the form.

Other objects of the invention are to provide a novel and improved mold for forming a decorative liner upon a modular, planar form which: holds the modular form within it with a precise fit to thus eliminate leakage: eliminates flashing and produces an accurate product; carries a master decorative design to product a negative matrix upon the modular form liner; is easily adjustable to vary the thickness of liners; and is a low cost, easily prepared, rugged and durable unit capable of being used with many modular forms.

Also disclosed is a novel and improved method for applying a form liner to the face of a form or a plywood sheet constituting of the form face which involve simple, easily performed steps with a minimum of waste of material and in an economical, rapid manner and without the formation of undesired bubbles at the decorative face, a common occurrence in casting plastic material.

With the foregoing and other objects in view, my present invention comprises certain constructions, combinations and arrangements of materials, and sequences, operations and steps, all as hereinafer described in detail, defined in the appended claims, and supplemented by the accompanying drawing in which:

Figure 4:
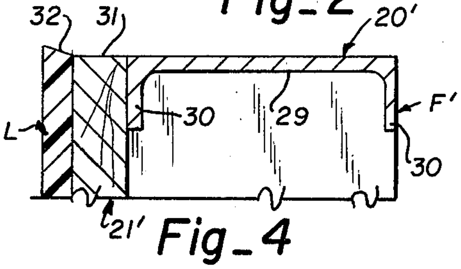
FIG. 4 is a fragmentary sectional view silimar to FIG. 2, but illustrating a different kind of modular concrete forms, with a decorative liner being molded thereof.

Other types of forms are available for use, and FIG. 4 illustrates a form F' of a different, more simple type which uses standard structural channel sections for the frame. In this modified arrangement of a frame 20', the channel webs 29 are at the outer edges of the form and the channel flanges 30 are inturned. The pin slots, not shown, are on the webs 29. A plywood face plate 21' is affixed to the adjacent channel flanges 29 in any suitable manner as by glueing or bolting, etc. and the outward edges 31 of this plywood 21' are flush with the outer edges of the channel webs 29 forming the frame 20'.

Figure 1:
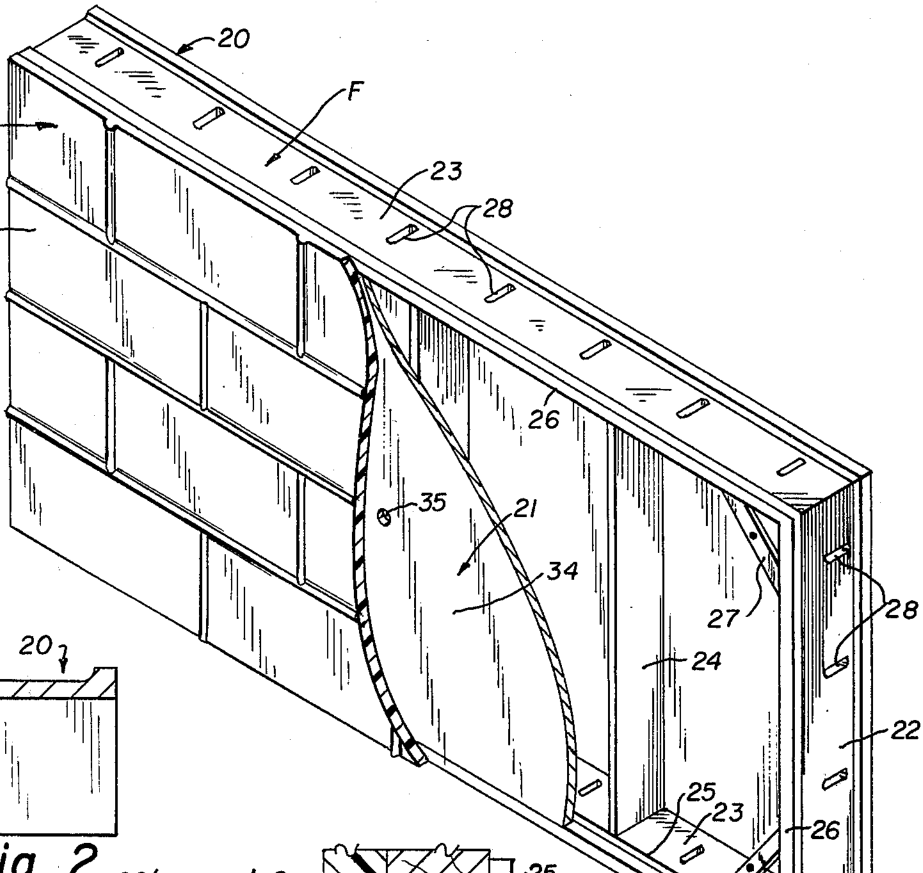
FIG. 1 is an isometric view of a modular concrete form having a resilient liner molded onto its face, according to the present invention; however, with portions of the liner and of the form face being broken away to show constructions otherwise hidden from view.
Figure 2:
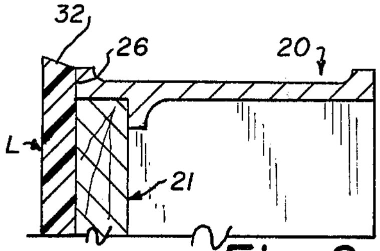
FIG. 2 is a fragmentary, sectional detail showing a typical edge portion of a form and liner with a flare at the edge of the liner being somewhat exaggerated to better illustrate its construction.

These forms F and F' are modified from conventional forms by having a resilient liner L molded against their faces with flared or bevelled edges 32, of each liner L, being at the peripheral edges of the form as best shown at FIGS. 2 and 4. The outer surface of the liner L will ordinarily be a decorative matrix against which concrete is poured, and such a matrix 33 is illustrated at FIG. 1 a being brickwork. However, this decorative matrix may be any one of a number of varying patterns which will repeat themselves within the space of the modular form.

The thickness of this form liner may vary depending upon the degree of roughness, depth of contours, etc., of the matrix on its surface and actually, this thickness, at the thinnest part of the liner, need not be much more than approximately paper thin or even showing the wood. It is to be noted that the edge of the form liner will extend to the outer periphery of the face of the form, and it will overlie the edge 26 of the metal frame of the modular form as illustrated at FIG. 2.

Referring to FIGS. 1 and 2 of the drawing, the modular concrete form F includes an open metal frame 20, a plywood face plate 21 and a resilient, elastromeric liner L mounted upon the face plate 21. The concrete contacting face of this liner L is a negative impression, or matrix, against which concrete will be poured when the form is in use, and it will ordinarily be an ornamental design as illustrated. The form is of any suitable size, but to permit it to be easily handled, by workers, it is relatively small, for example, a common size is 2 by 4 feet, 4 by 4 feet, etc. The frame is made up of shallow channel type members, with the web portions being at the outside of the frame, and consists of opposing sides 22 and opposing longitudinal top and bottom members 23. Struts 24, paralleling the side members 22, are mounted between the longitudinal members 23. A lip 25 extends about the inner periphery of the sides 22 and longitudinal members 23 to support the plywood face plate 21, and the struts 24 are inset from the edges of the sides and bottom members to the edge of the shelf 25 to also bear against and support the face plate 21. The thickness of the face plate 21 and location of the peripheral shelf 25 is such that the edges 26 of the frame members will be flush with the outer face of plate 21 as best illustrated at FIG. 2.

Figure 3:
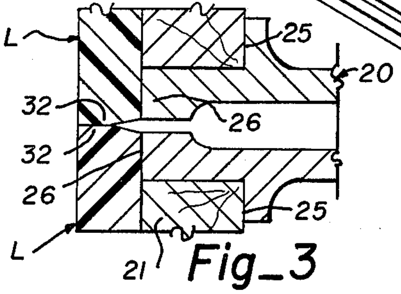
FIG. 3 is a fragmentary sectional portion on an enlarged scale to illustrate the manner in which the edges of two liners abut against each other in ganged modular forms.

The face plate 21 is secured to the frame 20 in any suitable manner as by screws, bolts, rivets, etc., not shown. Corner braces 27, at the lip level, may be used at each corner of the frame 20 to help hold the plate in position. To complete the basic form structure, arrays of transverse pin slots 28 extend about the sides and top and bottom edges 22 and 23 in any suitable, symmetrical the edge of the liner will extend to the edge of the plywood sheet 21'. The outwardly flared edge 32 of the liner provides a seal whenever two modular forms are locked together, each flared edge 32 being compressed against the edge of the opposite form as best shown at FIG. 3. This prevents undesirble flashing in the concrete structure shaped by the modular forms, and seals the edges of the forms together.

As heretofore stated, this flexible, resilient liner is preferably made of elastomeric polyurethane because of its toughness and resilience at a shore A hardness of 30–90. This does not, of course, eliminate the use of other equivalent elastomeric materials which may be available and when the term "polyurethane" is used, it is to be understood that this will include such equivalent elastomer, polymeric materials as might be available. The primary advantage of polyurethane, a property which is also found in other resins, resides in the fact that the precursors of polyurethane are available as two easily mixed liquids, i.e., a two-component system. The two components, both in a liquid state, are blended together and the blend will remain liquid for a short period of time, and then set into a polymeric, resilient elastomer. Thus, the liquid blend can be poured into a mold, having a modular form as one face of the mold, to set up as the liner L. The polyurethane will stick to clean plywood as face plate sheet 21, and to prepared metal surfaces as the edges 26 of the form frames 22 and 23 with such tenacity as to render any other device or means for holding the liner upon the form completely unnecessary. FIG. 1 also shows that the central area 34 of the face plate 21 may be coated with a release agent so that when the liner is molded thereon, the central portion of the liner does not adhere upon the plywood. A hole 35 through the face plate 21 in this center portion may be used to admit air under low pressure into the space between the plywood and liner in the central area 34 to cause the resilient, elastomeric liner to lift away from the face plate and function as a release bladder or air pod when separating the form from its mold or from concrete cast against it. The mold may also have a similar release bladder or air pod to better effect the separation action.

Figure 5:
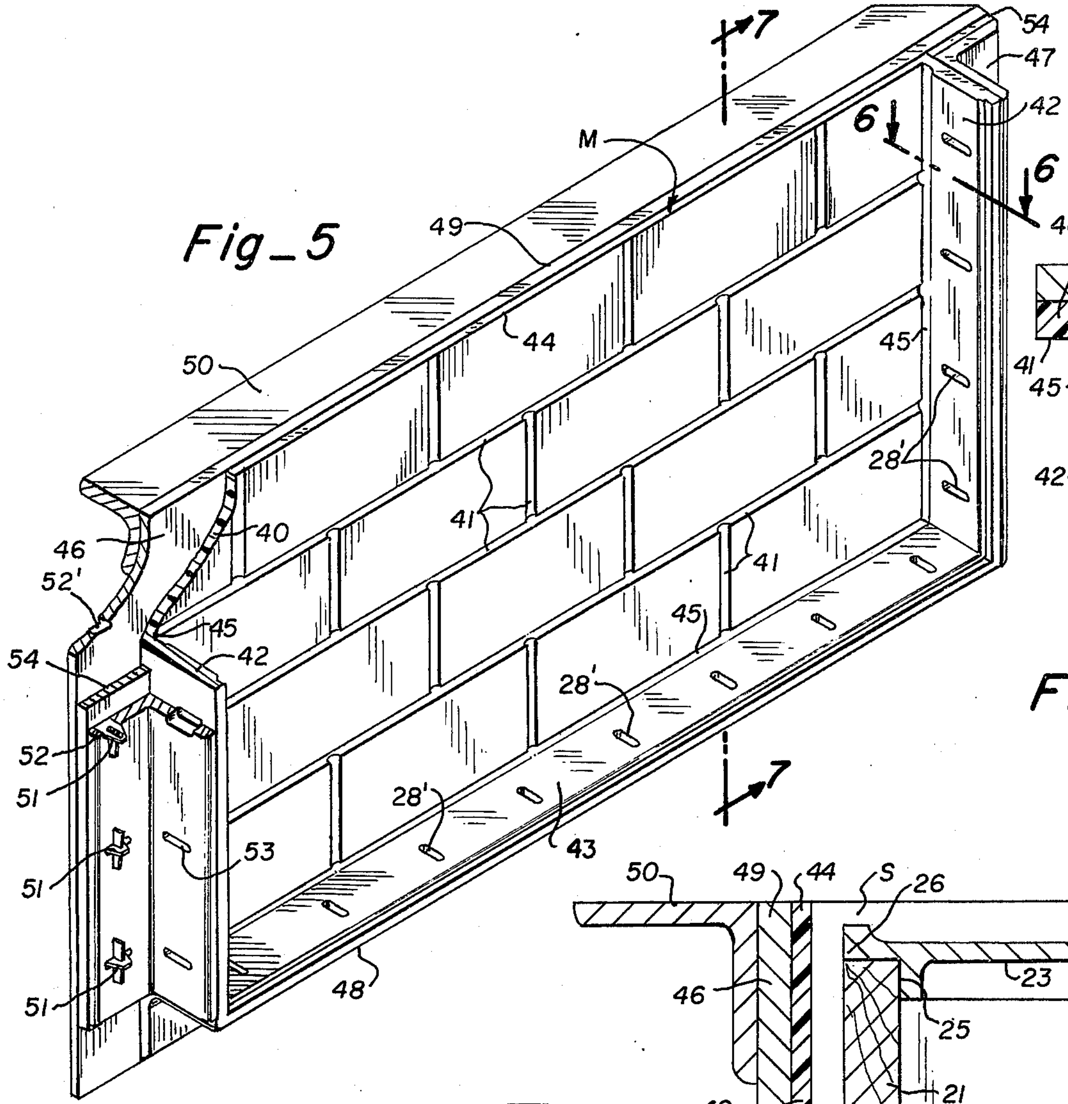
FIG. 5 is an isometric view of a mold for applying a liner to the face of a modular form in accordance with the present invention, and with portions of one corner of the mold being broken away to show constructions otherwise hidden form view.
Figure 6:
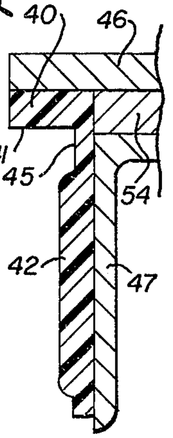
FIG. 6 is a fragmentary, sectional detail as taken from the indicated line 6—6 on an enlarged scale.

A mold M for producing this liner L upon a modular form F is illustrated at FIG. 5. The mold M is formed of a tough, resilient, polymeric material, which, also, may be polyurethane. The mold includes a planar face sheet 40 which is the same size as the modular form whereon a liner is to be placed. The exposed surface of this sheet 40, which is opposite the modular form, includes a positive decorative surface or master 41 which will shape the liner matrix 33. The mold M also includes an integral, outstanding standing flange 42 at each side of the planar sheet and an integral flange 43 across the bottom of the planar sheet. The top edge 44 is not flanged, however, to provide an opening for pouring polyurethane into the mold. The inner walls of each flange are shaped to correspond with the sides and bottom of the modular form F. as shown at FIG. 6. Also, a bevelled edge 45 is provided at the inner corner of the flanges which will form the flared edges 32 of the liner. This bevelled edge 45 is wide enough to engage the outer edge of a mòdular form, adjacent to the face edge 26, to produce a tight, leakproof fit when the modular form is enbraced by the flanges. The mold flanges include slots 28' which will register with slots 28 in the modular form, heretofore described, all to facilitate locking a modular form F into the mold M.

This resilient, elastomeric mold M is normally secured to and held in place by a planar backing sheet 46, which may be a comparatively rigid plywood sheet, somewhat larger than the metal form to accommodate backup angles 47 at the sides of the mold and a backup angle 48 at the bottom of the mold as will be further described. In some cases, the same size and shape of metal, modular form may be used for the plywood sheet. The upper edge 49 of plywood sheet may be reinforced by a rearwardly extended structural angle 50, if desired and no other frame is used. The outer surface of the sheet 40 is planar and smooth and will lie against this backing plywood sheet 46 and preferably, it is tightly adhered to the backing sheet 46 with the top edge 44 of the mold being essentially flush with the top edge 49 of the backing sheet 46. Each backup angle 47 and 48 supports the respective side and bottom mold flanges 42 and 43. These backup angles are secured to the backing sheet 46 at proper positions in any manner, as by lock pins 51 fitted through slots 52 in the angles and slots 52' through the backing sheet 46. Accordingly, the base leg of each backup angle will be at this backing sheet and the outstanding leg of each backup angle will rest against an adjacent mold flange. The outstanding leg of each backup angle 47 and 48 will include an array of slots 53 which register with corresponding slots 28' in the mold flanges and which also register with slots 28 in the modular form which is to be fitted into the mold. The entire assembly is accurately secured together with lock pins 51. It is contemplated that the base legs of the backup angles may be shifted towards and away from the master mold 46 to adjust the thickness of a liner to be formed in the mold, and such adjustment is accomplished by spacers 54 between the angle bars and the backing sheet, shown at FIGS. 7 and 8, the spacers being slotted as at 52' to receive the lock pins 51.

As mentioned, the mold M is preferably of a tough, resilient, elastomeric material such as polyurethane and it is contemplated that it may be made by casting. However, this mold M may be manufactured in any suitable manner as with a specially designed mold, not shown, and with the aid of any suitable material such as plaster of Paris. The master made by a special mold must include the sheet 40, a negative of the master surface 41 and the side and bottom flanges 42 and 43. This mold M may be formed against the backing sheet to adhere tightly thereto, and a specially finished modular form any be used to help form the mold M.

Figure 7:
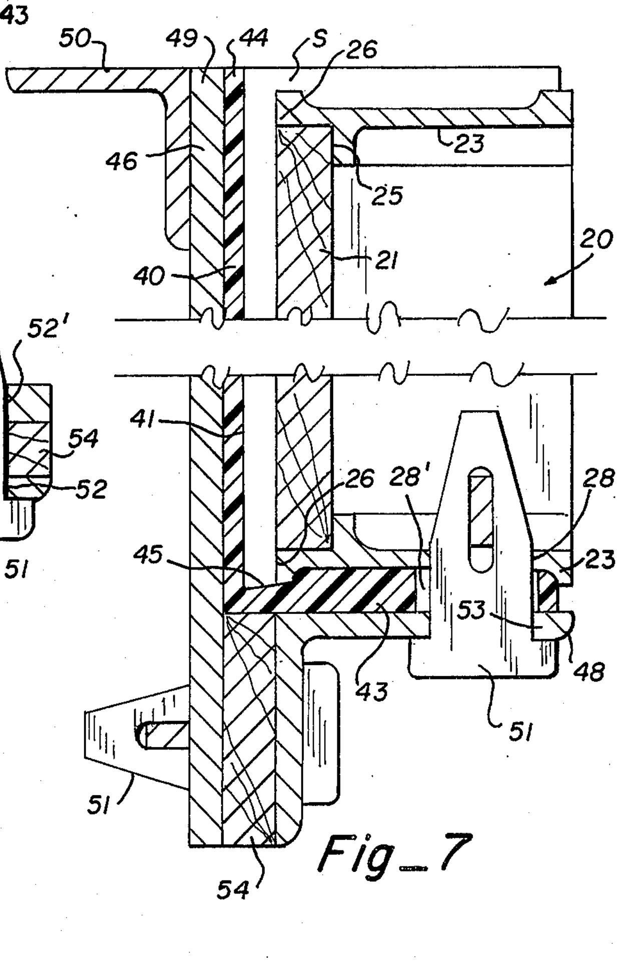
FIG. 7 is a transverse sectional view as taken from the indicated line 7—7 on FIG. 5, but on an enlarged scale, with the central portion broken away to conserve space, and with the modular concrete form shown in FIG. 1 being fitted in place in the mold prior to pouring a liquid precursor for the form liner in accordance with the principles of the invention.
Figure 8:
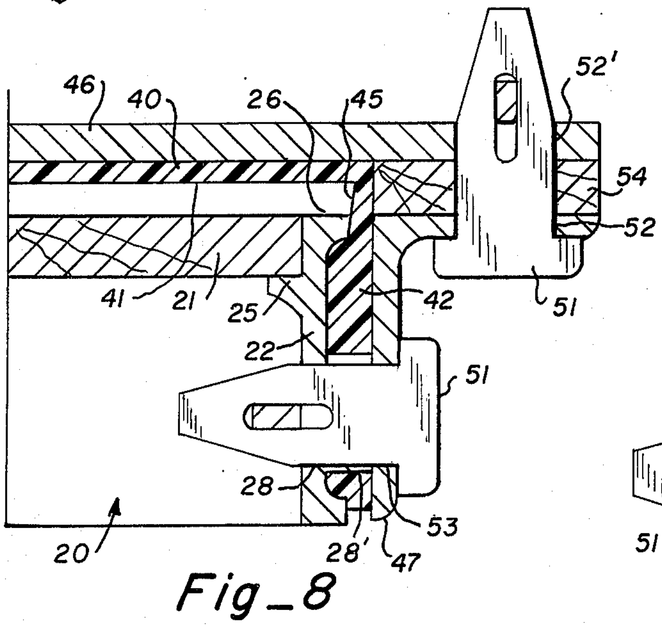
FIG. 8 is a fragmentary sectional detail of an edge portion of the mold as would appear from the indicated line 6—6 at FIG. 5, but with a modular concrete form being fitted into place.

FIGS. 7 and 8 illustrate the manner in which a modular form F, as shown at FIG. 1, is placed in the mold M to permit the form liner to be poured against the face plate 21 of the form. The backup angles 47 and 48 with slots 53 in registration with the form slots 28 will assure proper placement of the modular form in the mold. Then pins 51, are inserted into the several slots to lock the unit in place. Since variations in the liner thickness are desired, the slots 28' in the mold flanges may be somewhat wider than the slots 53 in the forms and the slots 28 in the angle. Thus, the actual spacing of the modular form surface away from the master mold face can be adjusted by suitable spacers 54 as indicated. It is to be noted that the peripheral edge 26 of the form frame members will tightly fit against the angled bevel 45 forming the corner of the mold as shown at FIGS. 7 and 8, and this comparatively tight fit actually forms a seal to prevent leakage between the mold and the frame form.

In some cases the mold M may be somewhat taller than the frame F to provide for a small excess of space 'S' as indicated at FIG. 7, and this excess space will permit the formation of a small puddle of liquid polymer when the mold is poured as is now described.

Figure 9:
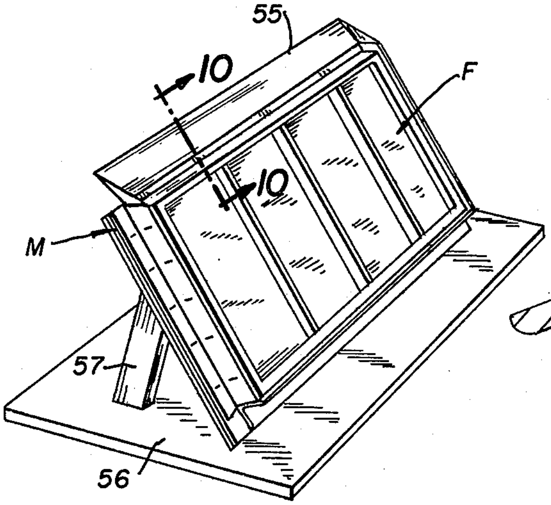
FIG. 9 is a small scale perspective view of the mold and form in place and tipped to an inclination preparatory to pouring the liquid precursors into the mold cavity to produce a decorative liner upon the form.
Figure 10:
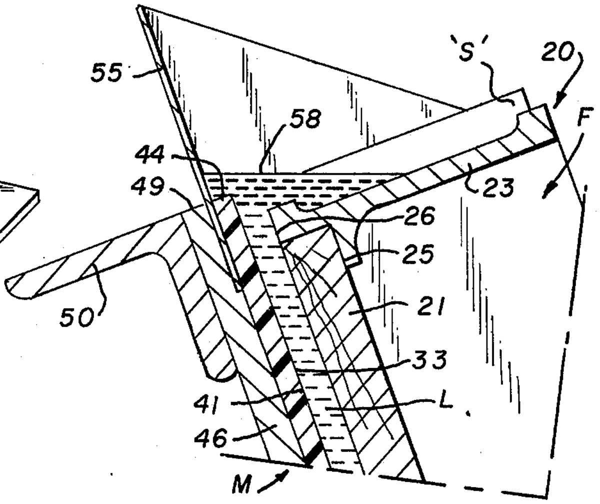
FIG. 10 is a fragmentary sectional detail as taken from the indicated line 10—10 on FIG. 9, but on an enlarged scale and showing the manner in which a small reservoir of liquid polymer is formed at the top of the mold to assure a sufficient reserve of material should some of the resin be lost as by leakage before setting of the polymer is completed.

To prepare the mold for pouring, a splash or pouring plate 55 is mounted at the top of the mold, and is conveniently fitted between the top edge 44 of the master mold and the top 49 of the mold backing sheet 49 as illustrated at FIGS. 9 and 10. The assembly is then mounted upon a suitable platform 56 (preferably on rollers for easy movement) and against an inclined rest 57 so that the mold and form within it are vertical or angled at a tilt approximating 10°–45° form the vertical. The two component liquid precursor is then blended and poured into the mold to form the liner L. This liquid, which may be a white, opaque liquid or of any other suitable color, will fill the narrow space between the mold M and the face plate 21 of the form F and any excess will form a small puddle 58 at the top of the mold as best shown at FIG. 10. The advantages of a pour with the mold M in the angled position becomes immediately apparent. It is desirable to produce a faithful reproduction of the master design without high pressure and by filling the mold cavity in this manner, the result is accomplished with an excellent reproduction of detail. The hydrostatic pressure of the liquid against the sides of the mold and the face plate 21 is sufficient to assure this good detail. Also, the inclination of the mold (and form within it) permits bubbles to escape from the liquid and move along the surface of the mold as long as the polyurethane remains liquid. However, should gas bubbles form as the urethane begins to set, the bubbles will migrate toward the plywood 21 of the form frame rather than against the surface of the mold. Accordingly, the matrix 33 formed against the master pattern 41 of the mold, will not be pitted by bubbles. As the liquid commences to set, in a few minutes, there may be small leaks between the mold and the modular form. In this arrangement, such leaks are not at all significant because the reservoir 58 of polyurethane above the top of the mold, as indicated at FIG. 10, flows in the cavity to take care of any such leakage until the polymer sets up.

After the polyurethane has set to produce a liner L upon the plywood, the modular form may be removed from the mold using the air bladder effect heretofore described to separate the modular form F from the mold M. Should the master be polyurethane, the most practical material for its manufacture, it may be necessary to provide a release agent over its surface to prevent the form liner form sticking to the master, and, therefore, any of a number of common release agents can be used for this purpose, if compatible with the system.

The final step in the preparation of the form will then be cutting or grinding away the set material of puddle 58, that is, cleaning the flash, formed at the top of the mold, as shown in FIG. 10. A sanding or grinding machine may be required to finish the edge, leaving a flared edge 32 such as shown at FIG. 2 on all four edges. Such flared edges will automatically be formed at the sides and at the bottom of the mold by its unique construction as heretofore described.

Figure 11:
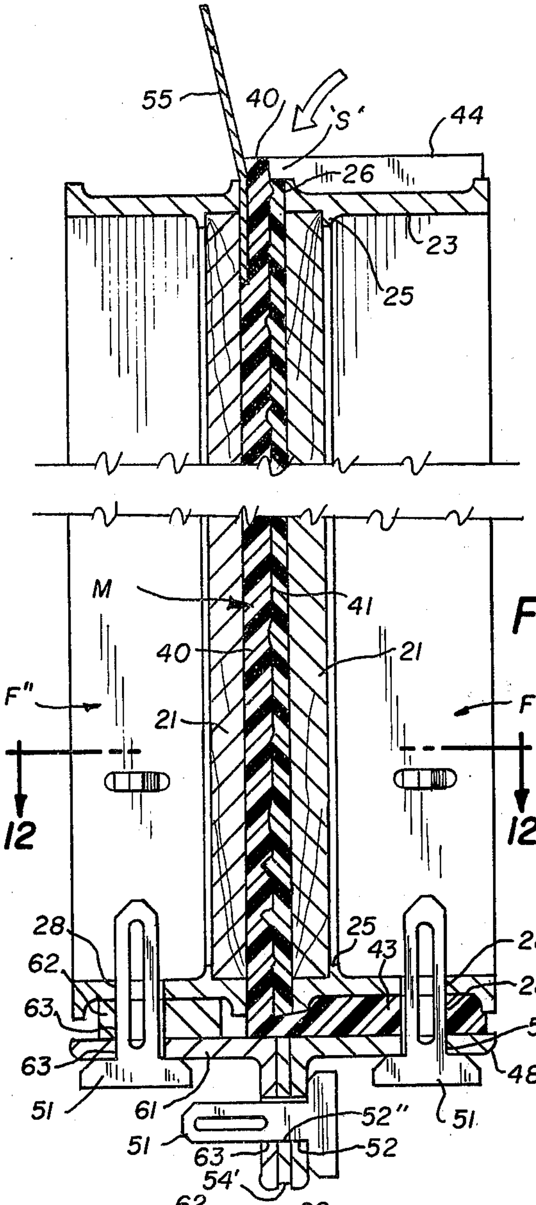
FIG. 11 is a sectional view similar to FIG. 7, but with a modified mold backing by using a second modular form to hold the pattern which permit other identical, modular forms to be attached to the form F with a high degree of precision by standard connector pins, hereinafter described.
Figure 12:
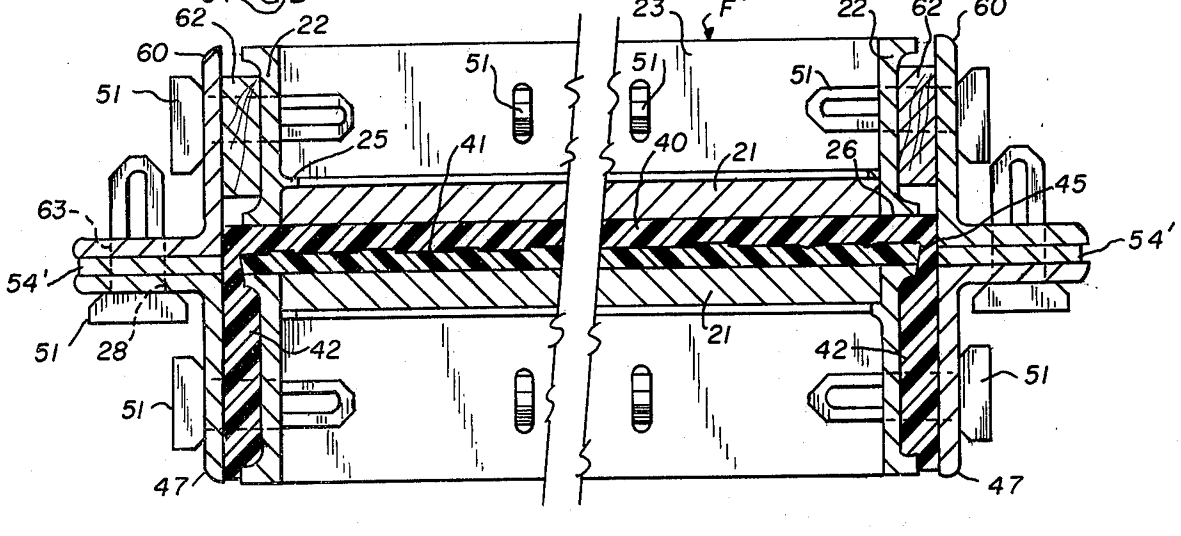
FIG. 12 is a sectional detail as taken from the indicated line 12—12 on FIG. 11, but with the center portion of the unit broken away to conserve space.

In lieu of the backing sheet 46 for holding the mold M in place, the backup for this mold M can be another modular frame F″ which is essentially identical with the modular frame F whereon the liner is placed as in the arrangement shown at FIGS. 11 and 12. It is to be noted that the backup form F″ will be held behind the mold M with the outer side of the face sheet 40 of the mold being tightly adhered to the form F″ if desirable, and that this form will be opposite to the position the modular form F will take within the mold. Side mount angles 60 and a bottom mount angle 61 will be positioned about this backup form F″. They will be held away from the sides and bottom of the form F″ by spacers 62 at a position which is precisely in alignment with the backup side angles 47 and backup bottom angle 48 heretofore described. A spacer 54′ will be positioned between the opposing side mount and bottom mount angles and their respective backup side and bottom angles 47 and 48. The side mount angles and bottom mount angles 60 and 61 will also include slots 63 which are in registration with the slots 28 of the form F″ and in registration with the slots 52 of the backup angles heretofore described. The spacers 62 will also include suitable slots 28″ and the spacers 54′ will include slots 52″ to permit the insertion of lock pins 51 to interlock the entire assembly together in a planar assembly. The use of this modified arrangement is precisely the same as heretofore described. A splash plate 55 is provided at the top of the mold as between the outside of the face sheet 40 and the form F″, as illustrated at FIG. 11 and the mold and modular form within it will be tipped during a pour of polyurethane.

I have now described my invention in considerable detail. However, it is obvious that others skilled in the art can build and devise alternate and equivalent constructions which are nevertheless within the spirit and scope of my invention. Hence, I desire that my protection be limited, not by the constructions illustrated and described, but only by the proper scope of the appended claims.

What is claimed is:

1. Apparatus for producing a flexible resilient polymeric liner and for bonding said liner to modular components of planar concrete forms for producing large planar, decorative concrete walls and the like comprising:

a. master mold means formed of flexible, resilient polymeric material including a planar section and integral flanges depending normally from the plane of said section around the edges of three adjacent sides and jointed together at the corners, there being a shallow, internal groove in said flanges adjacent said planar section, with rigid backing means attached to and supporting the resilient polymeric material of said planar section and said flanges, b. modular planar form means sized to seat in and be sealed by said flanges around three edges thereof with each one of said edges in sealing communication with said groove, c. removable means inclusive of wedging pins securing said master mold means with said modular planar form means with the planar section of said master mold means in generally parallel position with said modular planar form means, and d. supportive means on which said master mold means and said modular planar form means are non-permanently mounted for support in an upright position with said flanges along the sides and bottom of the assembly.

2. Apparatus according to claim 1 wherein:
said groove includes a portion adjacent said planar section and sloped outwardly therefrom, to produce an overhanging lip on the produced liner on said planar form means.

3. Apparatus according to claim 1 wherein:
said master mold means and said modular form means include extending thin metal backing means cooperative with said wedging pins holding said assembly together.

4. Apparatus according to claim 1 wherein:
said master mold means and said modular planar form means are supported at an angle from the vertical.

5. Apparatus according to claim 1 wherein:
said resilient material is polyurethane.

6. Apparatus according to claim 1 wherein:

said modular planar form means includes a clean surface without a release agent whereby polymeric material adheres to said surface.

7. Apparatus for producing a flexible, resilient polymeric liner and at the same time bonding the liner to the planar section of a modular concrete form for large planar wall-like concrete sections comprising:

a. master mold means including planar backing means and frame means therefor and flexible, resilient polymeric material attached to said backing means, including a planar section and integral flanges depending normally from the plane of said section around the edges of three adjacent sides and jointed together at the corners, therebeing a shallow, internal groove in said flanges adjacent said planar section, b. modular form means including a rigid planar backing means having a front planar surface and frame means supporting said planar surface, with edges extending from the opposite side of said planar surface, proportioned to fit snugly into said flanges of said master mold means in sealing communication, c. removable angle means positioned against and secured to said frame means of said master mold means, and removable angle means positioned against and secured to said frame means of said modular form means, d. spacing means removably inserted between said angle means for said master mold means and said angle means for said modular form means for maintaining said master mold means and said modular form means a predetermined distance apart and in parallel relation, e. means attached to each of said angle means for releasably securing said angle means together to hold said master mold means and said modular form means sealed together, and f. means supporting said in master mold means and said modular form means sides and bottom of the assembly.

8. Apparatus according to claim 7 wherein:

said polymeric material is polyurethane sufficiently soft and flexible to seal against the edges of said modular form means by pressure on said flanges.

9. Apparatus according to claim 7 wherein:

said modular form means planar surface is clean permitting poured polymeric material to seal thereagainst.

10. Apparatus according to claim 7 wherein:

said planar backing means of said modular form means is sheet material removable from said frame means of said modular form means.

* * * * *